United States Patent [19]

Nash et al.

[11] Patent Number: 4,571,936

[45] Date of Patent: Feb. 25, 1986

[54] LENGTH ADJUSTABLE STRUT LINK WITH LOW AERODYNAMIC DRAG

[75] Inventors: Dudley O. Nash, Cincinnati; James A. Crowley, Westchester, both of Ohio

[73] Assignee: The United States of America as represented by the Secretary of the Air Force, Washington, D.C.

[21] Appl. No.: 753,462

[22] Filed: Jul. 10, 1985

[51] Int. Cl.[4] .......................... F02C 7/20; B64D 27/16

[52] U.S. Cl. ...................................... 60/39.31; 60/262; 60/263; 248/554; 244/54

[58] Field of Search ................. 60/39.31, 39.32, 226.1, 60/262, 263; 248/554, 555, 556, 557; 244/54, 55

[56] References Cited

U.S. PATENT DOCUMENTS

| | | | |
|---|---|---|---|
| 804,696 | 11/1905 | Winterhoff | 403/43 X |
| 2,420,364 | 5/1947 | Espenas | 287/60 |
| 2,485,280 | 10/1949 | Grace | 254/98 |
| 2,783,809 | 3/1957 | Haines | 151/14 |
| 2,936,978 | 5/1960 | Lauck | 248/5 |
| 3,085,773 | 4/1963 | Anstrom et al. | 248/555 |
| 3,239,930 | 3/1966 | Violleau | 29/516 |
| 3,243,126 | 3/1966 | Kurti et al. | 239/265.39 |
| 3,398,535 | 8/1968 | Campbell et al. | 60/226 |
| 3,540,682 | 11/1970 | Dibble et al. | 60/39.31 X |
| 3,903,690 | 9/1975 | Jones | 60/226.1 X |
| 3,907,220 | 9/1975 | Amelio | 244/54 |
| 4,097,163 | 6/1978 | Dubuque | 403/46 X |
| 4,149,826 | 4/1979 | Torstenfelt | 415/127 |
| 4,213,585 | 7/1980 | Murphy | 244/54 |
| 4,266,741 | 5/1981 | Murphy | 248/554 X |
| 4,346,861 | 8/1982 | Legrand | 244/54 |
| 4,441,313 | 4/1984 | Joubert et al. | 60/266 |

*Primary Examiner*—Carlton R. Croyle
*Assistant Examiner*—Jeffrey A. Simenauer
*Attorney, Agent, or Firm*—Donald J. Singer; Gerald B. Hollins

[57] ABSTRACT

A low aerodynamic drag structural link suitable for use within the housing of a turbofan jet engine; the link includes length adjustment capability, pivotal end mounting provision, maintained airstream orientation capability, low mass and jam nut length and orientation locking. Several variations in link construction including a single ball and socket arrangement, varying link cross-section along its longitudinal length and the use of fairing nose and tail inserts are disclosed.

13 Claims, 5 Drawing Figures

3/8 24 THREADS

7/16 20 THREADS

Fig. 2
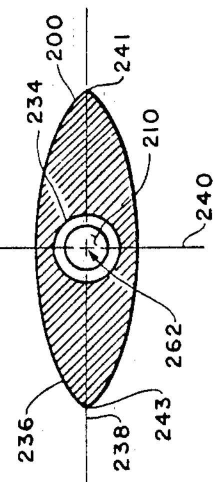
Fig. 2B
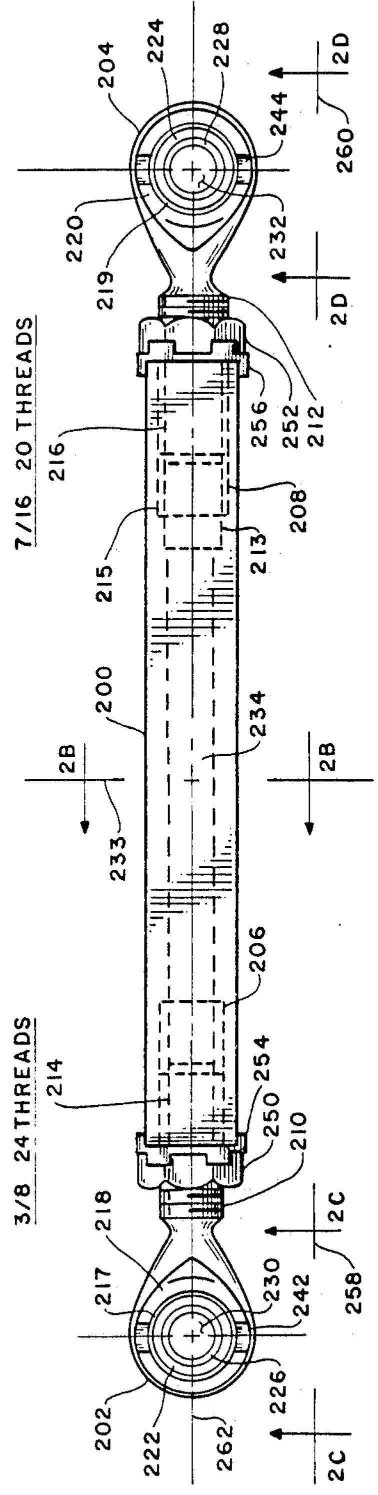
Fig. 2A
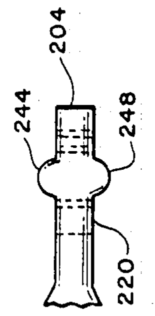
Fig. 2D
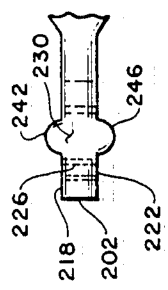
Fig. 2C

LENGTH ADJUSTABLE STRUT LINK WITH LOW AERODYNAMIC DRAG

RIGHTS OF THE GOVERNMENT

The invention described herein may be manufactured and used by or for the Government of the United States for all governmental purposes without the payment of any royalty.

BACKGROUND OF THE INVENTION

This invention relates to the field of structural link strut members having aerodynamically configured cross-section.

In the ducted turbofan aircraft power plant there is need to support a large heavy object precisely located within a circumferential outer shell while also minimizing drag and turbulence in a high-velocity stream of air flowing between the large heavy object and the outer shell. In such a configuration the large heavy object is of course, a jet engine containing a plurality of bladed compressor and turbine stages while the outer shell member comprises a duct for conveying a fan-generated flow of thrust increasing air around the jet engine. The fan generating the air flow around the jet engine in such a power plant is driven from the turbine member of the jet engine. The jet engine in this arrangement is sometimes known as the core engine; the fan generating the axial airflow around the jet engine can in some ways be considered a modern-day version of the aircraft propeller—the propeller in this instance being located within a housing or fan duct.

Since the core engine in this arrangement is completely surrounded by the housing or fan duct with only a relatively small and preferably precisely defined annular space existing between the core engine and fan duct, there is need for a carefully considered suspension or structural support network connecting the core engine with the fan duct. This suspension network is called upon inter alia to physically support the core engine in a rigid manner, i.e., with no degrees of freedom with respect to the fan duct other than freedom as necessary to allow for axial thermal expansion of the core engine relative to the lower temperature fan duct. Such support must of course be capable of withstanding forces directed along a plurality of axes and oppose complex rotational or torque forces resulting from engine operation. Such a support network must also minimally impede the flow of fan air through the housing annular space. Finally, the arrangement of links in such a network must allow for radial expansion of the core engine relative to the fan duct; pursuant to this, such links are frequently skewed rather than radially oriented.

The demands on such a suspension netork, usually fabricated from an array of connecting links, are further compounded by a need for convenient adjustment of the annular space dimensions and by the need to remove portions of a power plant conveniently for maintenance and repair purposes. Since the airstream flowing axially over the core engine connecting link members can have velocities considerably greater than that of the host aircraft—velocities easily reaching the supersonic flow range, careful consideration of the connecting link aerodynamic properties is also necessary.

The patent art shows several examples of aircraft engine mounting arrangements and engine supporting members including several such arrangements expressly intended for use in jet aircraft engines. Included in this patent art is the patent of L. J. Lauck, U.S. Pat. No. 2,936,978, which concerns a rear engine mount arrangement suited for use in a turbopropeller engine and including adjustable length links or struts 76.

The patent of R. J. M. Joubert et al, U.S. Pat. No. 4,441,313, also concerns an engine mounting arrangement suitable for use with multiple flow turbojet type engines or fan type engines, and includes a pair of tie rod or link members 81.

Other jet engine mounting arrangements are shown in the patents of J. C. Anstrom et al, U.S. Pat. No. 3,085,773, wherein FIGS. 3 and 4 show the use of two types of ball or spherical elements at the ends of a strut or link member; A. Kurti et al, U.S. Pat. No. 3,243,126, which includes circular cross-sectioned expandable links 70 and 72; W. B. Campbell et al, U.S. Pat. No. 3,398,535, which shows a plurality of struts 34 supporting portions of a jet engine; A. F. Amelio, U.S. Pat. No. 3,907,220, which includes an engine mount 18 and a pair of rods 29 and 30; N. A. R. Torstenfelt, U.S. Pat. No. 4,149,826 which concerns a temperature responsive switch mount; P. Murphy, U.S. Pat. No. 4,213,585, which includes strut-like members 34, 36 and 52; and P. J. Legrand et al, U.S. Pat. No. 4,346,861, which shows a series of elaborate engine mounting structures in FIGS. 1-4.

A second group of patents is concerned with the use of differential thread arrangements in the construction of link or strut-like members. This group includes the patent of A. K. Espenas, U.S. Pat. No. 2,420,364; J. F. Grace, U.S. Pat. No. 2,485,280; M. W. Haines, U.S. Pat. No. 2,783,809; and A. Violleau, U.S. Pat. No. 3,239,930. The Violleu patent concerns a connecting rod intended for use on an aircraft in a flight control apparatus and is shown in FIGS. 1 and 2 to include end terminations having ball bearing or spherical flexible mountings and held in position with a jam nut which is secured by a bendable thin washer.

Each of the above prior patent inventions falls short of providing an improved link arrangement suitable for use in high velocity airstreams as is afforded by the combination of the present invention.

SUMMARY OF THE INVENTION

An object of the present invention is to provide a lightweight adjustable length connecting link capable of minimum drag use in a high-velocity airstream.

Another object of the invention is to provide a connecting link arrangement which can be easily maintained in a desired predetermined orientation with respect to a surrounding airstream or other orientation references.

Another object of the invention is to provide the combination of high resolution length adjustment for a link in combination with fixed orientation of the link body cross-section.

Another object of the invention is to provide a connecting link arrangement which combines the features of swivel mounting, adjustable length, low aerodynamic drag, fixed orientation, jam nut retained length measurement, and high resolution differential thread length adjustment.

These and other objects of the invention can be achieved with a low drag structural link apparatus for mounting in a high velocity airflow stream region of an aircraft and for retaining first and second independent elements of said aircraft in predetermined juxtaposition, including a link body member disposed longitudinally between the aircraft independent elements and across the airflow stream region, the link body member having a streamlined cross-section extending along a first and second link cross-sectional axes with the larger first cross-sectional axis dimension extending substantially parallel to the airflow stream, a first link terminal member threadably received in the link body member at a first end thereof, and capable of connecting the link body member with the first aircraft element, a second link terminal member threadably received in the link body member at the second end thereof, and capable of connecting the body member with the second aircraft element, spherical pivot means located at a predetermined one of the first and second link terminal members for enabling pivotal, off-link-orthogonal engagement of the predetermined terminal member with one of the aircraft elements, and means for retaining the first link body member cross-sectional axis parallel with the airflow stream notwithstanding the spherical pivot means.

Additional objects and features of the invention will be understood from the following description and the accompanying drawings.

BRIEF DESCRIPTION OF THE DRAWINGS

FIG. 2 shows a low-drag adjustable length link including four views of the link.

DETAILED DESCRIPTION

Figure 1:
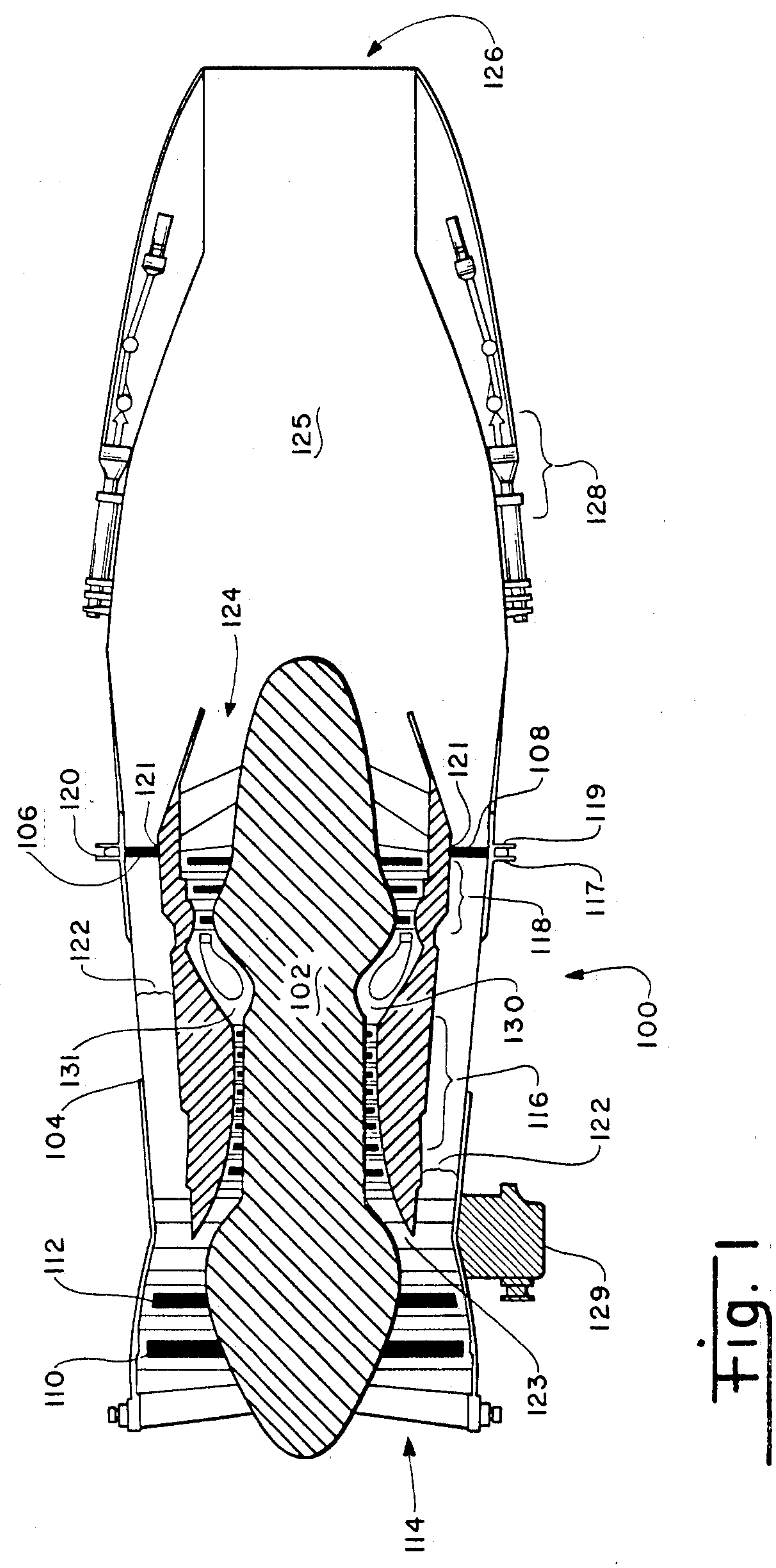
FIG. 1 is a cross-sectional view of a ducted turbofan engine which can employ the present invention apparatus.

In FIG. 1 of the drawings there is shown a cross-sectional view of a ducted turbofan aircraft powerplant or engine assembly 100 of the type commonly used in commercial and military aircraft. The engine assembly 100 includes a core engine of the jet type 102 and a pair of bladed fans 110 and 112 which are driven by the core engine 102. The core engine 102 includes a plurality of compressor stages 116, combustion chambers 130 and 131, and a plurality of hot gas-driven turbine stages 118.

During operation of the engine assembly 100 a portion of the inlet air received at the frontal opening 114 is captured by the inlet aperture 123 of the core engine 102 and then raised in pressure by the compressor stages 116, mixed with fuel and heated by flame in the combustion chambers 130 and 131. The mixture of air and combustion products then passes through the turbine stages 118 and the core engine rear aperture 124 into the plenum 125 and is subsequently exhausted along with bypass air from the engine assembly at the exhaust port 126. The portion of the inlet air received at the frontal opening 114 and not captured by the core engine inlet aperture 123 is bypassed around the core engine 102 in an annular space 122 which surrounds the core engine. This bypass air is mixed in the plenum 125 with the exhaust products of the core engine flowing from the rear aperture 124. The mixture of bypass air and core engine combustion products is exhausted as a high velocity thrust producing mixture at the power plant exhaust port 126.

The portion of the engine assembly 100 surrounding the core engine and the annular space 122 may be referred to as the fan duct or housing 104. The fan duct 104 includes several areas of structural reinforcement which can be used in attaching the engine assembly 100 to a host aircraft, one such structurally reinforced area is shown at 120 in FIG. 1. The fan duct or housing 104 is also normally used for mounting other portions of the engine assembly such as a fuel supply and control package indicated generally at 129, and thrust reversal, afterburner and exhaust port diameter controlling apparatus which is generally indicated at 128 in FIG. 1.

Since the annular space 122 used for conducting bypass air around the core engine 102 completely surrounds the core engine 102 and is preferably carefully controlled as to dimensions and configuration in the interest of engine assembly performance, it becomes clear that the arrangement for suspending the core engine 102 within the fan duct or housing 104 merits careful consideration. At the front end of the engine assembly 100 it is possible to employ an array of generally radially directed engine support members for holding the forward end of the core engine rigidly within the fan duct frontal opening. Since the air velocity in this large area frontal portion of the engine assembly 100 is of moderate magnitude, the aerodynamic implications of such a frontal engine support arrangement are not of major complexity. The support arrangement for the frontal end of the core engine 102 is not shown in FIG. 1.

A portion of the array of supporting and locating elements for the rear portion of the core engine 102 are indicated generally at 106 and 108 in FIG. 1. Since the rear supports for the core engine extend across the annular space 122 wherein the high velocity and high pressure bypass air from the fans 110 and 112 flow, careful consideration to the aerodynamic properties of these elements is warranted.

The support and locating elements 106 and 108 are subjected to loads directed radially with respect to the core engine 102, that is, to compression and tensile loads, and the combination of the elements 106 and 108, together with the frontal engine mounting arrangement is subjected to horizontally directed axial or thrust loads, and to torsional or twisting loads—as a result of acceleration or rotating parts in the core engine 102 and the fans 110 and 112. The radially directed loads on the elements 106 and 108 result from the engine mass being acted upon by gravity, upward and downward accelerations of the host aircraft and from gyroscopic effects produced by linear acceleration of the engine rotating components.

The length of the support and locating elements 106 and 108 is desirably made to be field adjustable in order to allow for convenient installation and removal of the core engine 102 from the fan duct 104 while also providing careful control over the concentric alignment of the fan duct 104, the annular space 122, and the rearward portions of the core engine 102 itself in the interest of engine assembly performance efficiency.

A structural member suitable for use as a support and locating element 106 and 108 in FIG. 1 is shown in FIG. 2 of the drawings. Structural elements of the general type shown in FIG. 2 are known in the art as struts, links, ties, connecting rods, or by other such names, and are frequently employed as force transmission coupling elements in moving machinery and for holding portions of an aircraft in position with respect to each other. The FIG. 2 link, which is shown most completely in FIG. 2A, includes a body portion 200, and a pair of link terminals 202 and 204 that include threaded shaft portions 210 and 212 received in tapped holes 206 and 208 located in either end of the body portion 200. The threads in the holes 206 and 208 at opposite ends of the body portion 200 of the FIG. 2 link may be of different pitch and different diameter. These threads may also be of reversed or opposite pitch—one in the right-hand thread direction and the other in the left-hand thread direction, if desired; such oppositely pitched threads at opposite ends of the body portion 200 can afford certain link lengths adjustment convenience features, as is described subsequently herein.

The link terminals 202 and 204 each include a swivel or pivotally mounted captive ball member 222 and 224 which is retained in the terminal body by snap rings or swedged areas or similar techniques known in the art, and as generally is indicated at 217 and 219 in FIG. 2. A pair of annular faces 226 and 228 are formed on the outer portions of the ball members 222 and 224 for engagement with surfaces located adjacent the ball mountings or with the head of a threaded bolt or other fastening device attached to the area of structural reinforcement 120 and to the rear attachment points 121 on the core engine 102 in FIG. 1. Holes 230 and 232 within the ball members 222 and 224 receive the threaded bolts, studs, pins, or whatever fastening members are elected for engagement with the members 120 and 121 in FIG. 1. The ball members 222 and 224 allow the threaded bolts, studs, pins or other fastening members to be aligned non-orthogonally with the longitudinal axis of the link body 200 if needed.

The exterior faces of the terminal members 202 and 204 in FIG. 2 may include a pair of flattened faces 218 and 220, in order to conveniently receive a snap ring or similar device at 217 and 219 and for mounting convenience. Terminal members of the thus far described type are generally available in the aircraft component market as items of commerce, such terminals are well known in the art, as is further evidenced by the showing in FIG. 1 and FIG. 2 of the above referenced U.S. Pat. No. 3,239,930 of A. Violleau.

FIG. 2B of the FIG. 2 drawing shows a cross-sectional view of the link body taken along the cutting line 233 in FIG. 2A. As indicated in FIG. 2B, the link body 200 preferably has a curving parabolic or ellipsoidal cross-sectional outline 236 which is disposed around a pair of coordinate or orthogonal axes 238 and 240. The intersection of the axes 238 and 240 coincides with the longitudinal axis 262 of the link member in FIG. 2B. The link body cross-section shown in FIG. 2B is symmetrical about both of the coordinate axes 238 and 240. Such double axis symmetry is a preferred, but not the only possible arrangement for achieving desirable aerodynamic properties in the FIG. 2 link. Other link cross-sectional shapes having symmetry about the axis 238, but lacking symmetry about the axis 240 could, for example, be employed to achieve desirable link aerodynamic properties. Such arrangements, for example, might have either a sharper or blunter nose 241 and yet provide desirable properties in the high velocity airflow expected in the annular space 122 in FIG. 1.

A cross-sectional shape lacking symmetry about the axis 238 in FIG. 2B would tend to provide the link of FIG. 2 with aerodynamic lift or develop forces parallel with the axis 240 in the presence of a moving airstream. In some uses of the FIG. 2 apparatus, such lift may be desirable, however, for the FIG. 1 illustrated use of the FIG. 2 apparatus, symmetry and the absence of lift are preferred. Cross-sectional shapes having equal radial dimensions along the axes 238 and 240 would of course, be circular in nature and would resemble the link or strut member configuration shown in several of the above-referenced patents.

For use in the core engine rear support arrangement shown at 106 and 108 in FIG. 1, and indeed, for most plausible uses of the FIG. 2 illustrated apparatus, orientation of the link body cross-section such that the encountered airflow is directed parallel with the axis 238 is desirable in order to achieve minimum aerodynamic drag from the link element. Maintaining of this preferred alignment between the link cross-section and the encountered airflow can be achieved through the use of protuberance member additions 242, 244, 246 and 248 viewable in the combination of FIGS. 2A, 2C, and 2D in FIG. 2. FIGS. 2C and 2D are taken along the viewing lines 258 and 260 in FIG. 2, and therefore represent elevation or profile views of the terminal members 202 and 204.

The protuberance members 242–248 in FIG. 2 represent additions to the faces 218 and 220 on the terminal members 202 and 204 and serve to engage planar surfaces located parallel with the faces 218 and 220 in the engine assembly of FIG. 1 or in other mounting locations of the FIG. 2 apparatus. By way of the protuberance members 242–248, misalignment of the link axis 238 in FIG. 2 relative to the air flow is precluded once the link has been mounted in a use position. The combination of the swivel balls 222 and 224 with the protuberance members 242–248 allows the axis of the threaded member or pin received in the holes 230 and 232 to be non-orthogonal with the longitudinal axis 262 of the link body member 200, while yet maintaining the cross-sectional axis 238 parallel with the airflow stream.

The protuberance members 242–248 may, for example, engage the structural members 117 and 119 which comprise the area of structural reinforcement 120 in FIG. 1. By way of this protuberance member engagement, both the link terminal 202 and the body portion 200 are precluded from rotating and becoming axis skewed with respect to the airstream. In uses of the FIG. 2 apparatus wherein the terminal members 202 and 204 are not rigidly mounted, but are attached to a moving member, as for instance, might occur if the FIG. 2 link were used as a connection between a rotating faceplate and a bell crank member, (in an adjustable dimension apparatus, for example) the protuberances 242–248 or at least one pair of such protuberances, can be arranged to frictionally engage a portion of the moving apparatus in order to maintain a desired link axis 238 alignment. In such an arrangement the protuberance 246, for example, might engage the rotating faceplate frictionally. The provision of anti-friction materials, lubrication, and other amenities desirable for such a frictional engagement is of course, known in the machinery art. Bell crank use of the FIG. 2 link might be desirable, for example, in a wing flap lowering or engine exhaust nozzle configuration changing application of the FIG. 2 link.

A pair ofjam nuts 250 and 252 are shown in FIG. 2 for the purpose of holding the link body 200 in a predetermined axis relationship with respect to the threaded shaft portion of the terminal members 202 and 204. The jam nuts 250 and 252 are tightened against the ends of the link body portion 200 to hold the link cross-sectional axis 238 in a predetermined alignment position. Jam nut locking devices in the form of bendable ear thin washers are shown at 254 and 256 in FIG. 2. Alternate retention arrangements for the jam nuts 250 and 252 including conventional spring lock washers and safety wire passed through drilled hole nut apertures are of course known in the art.

For use in an aircraft or spacecraft or other critical weight locations, it is desirable for the FIG. 2 link member to have the greatest possible strength-to-weight ratio. Large strength-to-weight ratios can be achieved with a careful selection of fabrication materials for the FIG. 2 apparatus; metals such as titanium, nickel alloys, aluminum alloys, and high strength steel are preferred for the link body portion 200, while wear resistant alloys or wear resistant coatings are preferred for the terminal members 202 and 204. The strength-to-weight ratio of the link body portion 200 can also be improved by eliminating the presence of body material immediately around the longitudinal axis 262, material which is structurally inefficient, but nevertheless contributing to overall weight. Elimination of material in this manner is represented by the hole or cavity 234 passing through the link body portion 200.

As indicated in FIG. 2, different thread pitches are preferred for use at opposite ends of the link body portion 200 in order that small increments of link length be achievable while maintaining the link body cross-sectional axis 238 in desired alignment with the airflow stream. With the twenty per inch and twenty-four per inch thread pitches indicated, link length adjustment increments of 0.0042 inch are attainable; that is, a movement of the terminal member 202 toward the left in FIG. 2 accompanied by a corresponding movement of the terminal 204 to the left in FIG. 2 results in 0.0042 inch of link length change-for one-half revolution of both terminals. One full revolution of the twenty-four thread terminal 202 provides 0.0416 inch of length change, while one full revolution of the twenty-thread terminal 204 provides 0.05 inch of length change, and the above-indicated simultaneous movement of each terminal in the same direction provides the difference between these two numbers, or 0.0084 inch of length change per full revolution of both terminal members. The 0.0042 of four one-thousandths of an inch resolution is adequate for most aircraft uses of the invention. Other thread arrangements including, for example, a combination of english and metric threads could be employed within the spirit of the invention in order to achieve greater or lesser resolution as needed.

In instances where the high degree of resolution indicated above is not necessary, it may be convenient to employ oppositely pitched threads at the two ends of the link body portion 200 in order that greater length adjustment can be achieved with each half turn of the body portion 200, that is, in order that the FIG. 2 structure be adjustable in the manner of a turnbuckle. Such an arrangement would, of course, enhance the desirability of the symmetrical cross-sectional shape shown in FIG. 2B, since one-half turn positioning of the link body portion may be required in combination with the maintenance of desirable axis alignment and aerodynamic properties. The different thread pitch system indicated at 214 and 216 may be identified generally as a differentially threaded arrangement.

The FIG. 2 link also includes the use of different diameters for the threaded shaft portions 210 and 212 of the terminals 202 and 204; such use of different diameters allows the attainment of differential threading while also enabling use of standard size threaded members—and illustrates the further aspect of the invention that the terminals 204 and 206 can be of different sizes and configurations if needed. The different diameters involved in the drilling and threading of the body portion 200 for the larger threaded shaft portion 212 are indicated in 213 and 215 in FIG. 2B.

Although use of the FIG. 2 apparatus within the fan duct or housing 104 is a contemplated utilization of the invention, clearly other aircraft and other non-aircraft uses are possible. Use of the FIG. 2 structure below the waterline in a watercraft, or in connection with large pumps or other moving fluid environments are, of course, related possibilities.

Numerous other variations of the FIG. 2 structure are also possible within the spirit of the invention. According to one such variation, the captured ball terminals 202 and 204 located at opposite ends of the link body 200 can be replaced with a single protuberant ball member mounted at the exposed end of one of the threaded shaft portions 210 and 212. The protuberant ball could in turn be received in and captured by a socket member located on either the core engine 102 or the housing 104 in FIG. 1. Since the protuberant ball and capturing socket are matable parts in any related rotational positions, need for a second threaded member and differential threading are thereby eliminated.

Another variation of the FIG. 2 link member results if the cross-section of the link member as shown in FIG. 2B of the drawings is varied along the length of the body portion 200. Both the shape and size of the body portion 200 can be varied to suit structural loading or strength needs of the link and to suit the aerodynamic needs of the link use application. A link configuration wherein the body portion 200 becomes narrow or slim along the axis 240 toward the central link length portion—where the highest velocity air flows occur, may for example, be desirable. Such slimming along the axis 240 could be accompanied by increased dimensions along the axis 238 if needed for structural integrity or aerodynamic considerations.

Another variation of the FIG. 2 lilnk desirable from manufacturing considerations involves fabricating one or both of the nose and tail portions 241 and 243 of the link cross-section in FIG. 2B as a fairing insert. Such fairing inserts could be fabricated from sheet metal and be of hollow cross-section if desired and thereby eliminate the cost and weight attending solid nose and tail cross-sections in the link. Since sheet metal insert nose and tail cross-sections can be formed by bending dies rather than casting and machining, a saving in link cost can be realized by a fairing insert arrangement.

While the apparatus and method herein described constitute a preferred embodiment of the invention, it is to be understood that the invention is not limited to this precise form of apparatus or method, and that changes may be made therein without departing from the scope of the invention, which is defined in the appended claims.

We claim:

1. In combination:

an aircraft jet engine;

an engine housing concentrically surrounding said engine and separated therefrom by an annular air flow space;

fan means within said housing and connected with said jet engine for generating high velocity axial air flow in said annular air flow space along the length of said engine and housing;

a structural link body member disposed across said annular airflow space between said jet engine and engine housing, said link body member having an air foil cross-section lengthwise disposed in said axial airflow in said annular airflow space;

and including means for limiting pivotal movement of said link body member about its longitudinal axis; and differentially threaded termination means for connecting respective ends of said link body member with said jet engine and said engine housing;

whereby lengthwise disposition of said air foil cross-section in said axial airflow and high resolution adjustment of the annular space between said jet engine and said housing are simultaneously achievable.

2. The apparatus of claim 1 including a plurality of said structural link body members each including differentially threaded termination means.

3. The apparatus of claim 2 wherein said differentially threaded termination means includes first and second terminal members, one at each end of said structural link body member and wherein said first terminal member is connected with said structural link body member by threads of a first pitch and said second terminal member is connected with said structural link body member by threads of a second, different, pitch.

4. The apparatus of claim 3 wherein said terminal members include ball and socket pivotal connector means for receiving link to engine and link to housing attachment members disposed along axes substantially orthogonal of said link body member.

5. The apparatus of claim 4 wherein said means for limiting pivotal movement includes protuberance means located on the link body member attached portions of said ball and socket pivotal means of each said terminal members and engageable with engine connected and housing connected planar surfaces, respectively.

6. The apparatus of claim 5 wherein said link body member air foil cross-section is symmetrical about each axis of a pair of link cross-section axes.

7. The apparatus of claim 6 wherein said link cross-sectional axes are disposed respectively along said axial airflow direction and radially orthogonal thereto with respect to said jet engine.

8. The apparatus of claim 7 further including jam nut means received on said threads of each of said terminal members and engageable with said link body portion for retaining said terminal members and link body portion in predetermined fixed relationship.

9. The apparatus of claim 8 further including jam nut means retaining means for retaining said link body portion and said jam nut means in fixed relationship.

10. Low drag structural link apparatus for mounting in a high velocity airflow stream region of an aircraft while retaining first and second elements of said aircraft in predetermined juxtaposition comprising:

a link body member disposed logitudinally between said aircraft independent elements and across said airflow stream region, said link body member having a streamlined cross-section extending along first and second link cross-sectional axes with the longer first cross-sectional axis extending substantially parallel to said airflow stream;

a first link terminal member threadably received in said link body member at a first end thereof and capable of connecting said body member with said first aircraft element;

a second link terminal member threadably received in said link body member at the second end thereof and capable of connecting said body member with said second aircraft element;

spherical pivot means located at a predetermined one of said first and second link terminal members for enabling pivoting and off-link-orthogonal engagement of said predetermined terminal member with one of said aircraft elements; and means for retaining said first link body member cross-sectional axis parallel with said airflow stream, notwithstanding pivot capability residing in said spherical pivot means.

11. The apparatus of claim 10 further including a second of said spherical pivot means located at the remaining one of said link terminal members for enabling pivoting and off-link-orthogonal engagement of said remaining terminal members with the remaining of said aircraft elements.

12. The apparatus of claim 11 wherein said means for retaining said link body member cross-sectional axis parallel with said airflow stream includes protuberance elements integral with one of said link terminal members and engageable with one of said aircraft elements.

13. The apparatus of claim 12 wherein said first and second link terminal members include rotationally similar, differentially pitched threads.

* * * * *